Patented Aug. 31, 1954

2,688,037

UNITED STATES PATENT OFFICE 2,688,037

MANUFACTURE OF GLUTAMIC ACID

Forest A. Hoglan, Toledo, Ohio, assignor to International Minerals & Chemical Corporation, a corporation of New York No Drawing. Application March 8, 1951,
Serial No. 214,637

4 Claims. (Cl. 260—527)

The present invention relates to the manufacture from Steffen's filtrate of inorganic salts, glutamic acid, and substantially ash-free hydrolysate end liquors. More particularly, this invention, which involves the sulfuric acid hydrolysis of Steffen's filtrate, relates to the production of inorganic sulfate salts, substantially pure glutamic acid, and hydrolysate end liquors which are abnormally low in ash constituents.

The partially desugarized solution which results from the Steffen's process is known in the sugar industry as Steffen's filtrate and consists of a dilute aqueous solution containing approximately 95% by weight of water and about 5% by weight of a complex mixture of organic and inorganic compounds. Inorganic compounds comprise mainly salts of sodium, potassium, and calcium; while the organic compounds include glutamic acid, glutamic acid mother substances, betaine, organic acids, and minor amounts of other amino acids.

Numerous processes are known for the recovery of glutamic acid from Steffen's filtrate subsequent to hydrolysis under either acidic or alkaline conditions. Hydrolytic agents commonly employed include sulfuric acid, hydrochloric acid, caustic soda, lime, and the like. The hydrolysate may be treated in a various number of ways to isolate the glutamic acid therefrom. Glutamic acid is generally recovered from the hydrolysate by adjusting the pH of the hydrolysate to the isoelectric point of glutamic acid and separating the glutamic acid crystals from the acidic solution. The extent of glutamic acid recovery, as well as the amount and composition of the by-products obtained, vary considerably with the type of process employed. In all processes involving the recovery of glutamic acid by crystallization, the major portion of non-recoverable glutamic acid is that which remains dissolved in the hydrolysate end liquor. Since the solubility of the glutamic acid remains substantially constant for all types of end liquors, regardless of the process employed, the recovery of glutamic acid is directly dependent on the quantity of hydrolysate end liquor produced. Processes involving alkaline hydrolysis of Steffen's filtrate ordinarily give lower recoveries of glutamic acid due to losses resulting because of the inherent production of large quantities of end liquor. On the other hand, processes involving acid hydrolysis, although more complex, yield higher glutamic acid recoveries than do the alkaline processes.

The extent to which the quantity of end liquor can be reduced depends upon the degree to which the concentration of the hydrolysate can be carried. The degree of concentration of the hydrolysate solution is determined largely by the quantity of impurities, especially organic impurities in the hydrolysate. It is obviously desirable, therefore, to remove such impurities as completely as possible prior to the concentration step. In processes involving acid hydrolysis, some of the organic impurities, including carbohydrates, are converted into insoluble humin during the acid hydrolysis step, and this humin can be removed by filtration. Alkaline hydrolysis, on the other hand, does not produce insoluble humin and, therefore, does not permit the same degree of concentration that is possible for acidic hydrolysates.

The hydrolysate end liquor obtained after the removal of glutamic acid comprises a complex mixture including betaine, amino acids, organic acids, and substantial amounts of inorganic salts formed by the hydrolytic and neutralizing agents employed. In order to render the hydrolysate end liquor useful, for example, as a nutrient composition, inorganic ash-forming salts must have been removed as completely as possible.

A method for producing end liquors, which are low in ash-forming compounds, from proteinaceous compositions is described and claimed in patent applications of Blish, "Manufacture of Protein Hydrolysates," Serial No. 50,655, filed September 22, 1948, now Patent No. 2,598,341; and of Hoglan, "Production of Glutamic Acid," Serial No. 77,059, filed February 17, 1949, now abandoned. In these processes, a proteinaceous substance, such as wheat gluten, is hydrolyzed with sulfuric acid employing conventional conditions of temperature, time, and pressure. The acidic hydrolysate is then adjusted to a pH of between 9.0 and 11.0 with an alkaline earth metal oxide, hydroxide, or carbonate. Insoluble salts thus formed are removed, and the resulting solution is heated to remove ammonia. The resulting solution is then adjusted to a pH of between 5.0 and 7.0 by the addition of acids whose salts with alkaline earth metals are insoluble in water. The insoluble salts thus produced are separated, and the resulting solution is concentrated in order to crystallize tyrosine, leucine, and other amino acids. These neutral amino acids are separated, and the resulting solution is diluted and adjusted to a pH of between 2.5 and 3.8 with sulfuric acid. Insoluble alkaline earth metal sulfates are separated from the solution, and glutamic acid is recovered therefrom.

When either of these methods is applied to Steffen's filtrate, an ash-free end liquor is not obtained because Steffen's filtrate raw material contains different organic impurities and inorganic salts and thus must be handled in a different manner. Unlike the proteinaceous compositions, Steffen's filtrate contains substantial amounts of potassium which must be removed in order to obtain an end liquor which is abnormally low in ash-forming compounds.

It is an object of this invention to provide an improved and commercially feasible process for the production from Steffen's filtrate of glutamic acid and of hydrolysate end liquors which are abnormally low in ash-forming compounds.

It is a further object of this invention to provide a process for the production from Steffen's filtrate of substantially pure glutamic acid and a hydrolysate end liquor, which is abnormally low in ash-forming compounds and of glutamic acid.

It is a further object of the instant invention to produce by the sulfuric acid hydrolysis of Steffen's filtrate, substantially pure glutamic acid, inorganic sulfate salts, and end liquor containing betaine but abnormally low in ash-forming constituents.

These objects, as well as other objects which will become apparent upon a fuller understanding of the invention, are accomplished by employing the hereinafter described novel process which affords a procedure conducted without the addition of alkali metal compounds. In addition, the quantity of alkali metal compounds initially present in the Steffen's filtrate is substantially reduced in the final hydrolysate end liquor.

In general, the process comprises separating inorganic salts from Steffen's filtrate at a pH of between about 2.0 and about 2.9, subjecting the solution from which the salts have been separated to hydrolysis with sulfuric acid, adding to the resulting hydrolysate an agent selected from the group consisting of alkaline earth metal oxides, hydroxides, or carbonates in sufficient amount to obtain a pH of between about 5.0 and about 7.0. Solid material is removed from the resulting mixture, and the solution from which the solids have been removed is concentrated. The pH of the solid-free liquid is adjusted to the isoelectric point of glutamic acid with an acidic material selected from the group consisting of acids and acid anhydrides whose salts with alkaline earth metals are substantially insoluble. For this purpose, acidic materials, such as phosphoric, sulfuric, oxalic, and sulfurous acids and the anhydrides thereof are suitable. Alkaline earth metal salts are removed from the resulting mixture, and glutamic acid is recovered therefrom.

More particularly, the novel process comprises treating Steffen's filtrate which has preferably been concentrated to a specific gravity of between about 1.2 and about 1.4 with sufficient sulfuric acid to give a pH of between about 2.0 and about 2.9. While concentrated sulfuric acid is preferably employed in this step, more dilute solutions of sulfuric acid may also be employed. After the resulting inorganic sulfate salts have been separated from the solution, sulfuric acid is added and the resulting solution hydrolyzed. The hydrolysate is partially or completely neutralized with an agent, of the type previously described, to a pH of between about 5.0 and about 7.0, preferably of about 5.5, and insoluble organic material or humin and the precipitated alkaline earth metal salts are separated from the adjusted hydrolysate. The solution from which the salts have been removed is concentrated and sufficient acidic material of the type above described is added to the filtrate to adjust the pH to between about 2.5 and about 3.5. Calcium is removed from the solution in the form of the insoluble calcium salt of the aforesaid acidic reagent. The resulting solution is then evaporated beyond the saturation point of glutamic acid. Upon cooling the concentrated solution, crystalline glutamic acid precipitates and is separated therefrom. The liquor from which the glutamic acid has been separated is abnormally low in inorganic compounds or ash-producing substances and is the hydrolysate end liquor containing betaine.

In a preferred embodiment of the instant novel process, Steffen's filtrate, concentrated to a specific gravity of between about 1.2 and about 1.4, is treated under non-hydrolyzing conditions with sufficient sulfuric acid to give a pH of between about 2.0 and about 2.9, preferably about 2.7. The temperature of the Steffen's filtrate is not permitted to exceed about 70° C. during the addition of the sulfuric acid. The resulting mixture is allowed to cool to a temperature of between about 0° C. and about 50° C., and the inorganic sulfate salts, in particular sodium and potassium sulfate, are crystallized and separated therefrom. The separation of the salts may be accomplished by any suitable means, for example, with a filter press or a basket centrifuge.

The resulting filtrate is then hydrolyzed by adding concentrated sulfuric acid and heating at a temperature of between about 100° C. and about 125° C. for between about six and about seven hours, or until the glutamic acid mother substances are substantially completely converted to glutamic acid. The pH of the hydrolysate is adjusted to between about 5.0 and about 7.0, preferably to about 5.5, by the addition of a compound selected from the group of oxides, hydroxides, and carbonates of alkaline earth metals. If, for example, lime is employed in the aforementioned pH adjustment, calcium sulfate precipitates and is removed together with humin from the adjusted hydrolysate, for example, by filtration. The resulting filtrate is concentrated to a specific gravity of between about 1.10 and about 1.40, and the pH of the concentrated hydrolysate is adjusted to about 3.2 by means of a suitable acidic material, preferably concentrated sulfuric acid. Calcium sulfate is separated from the resulting acidic mixture which is then concentrated, preferably in vacuo, to a specific gravity of between about 1.15 and about 1.60. The resulting solution containing glutamic acid is allowed to stand in order to permit crystallization of glutamic acid. The crystalline glutamic acid is separated from the hydrolysate end liquor, for example, by filtration or by centrifuge.

The glutamic acid separated from the end liquor can be further purified by suspending the glutamic acid in water, adjusting the pH of the resulting solution to about 0.7, for example with sulfuric acid, and adding decolorizing carbon to the adjusted solution. After decolorization of the solution, the carbon is separated from the decolorized solution, for example by filtration, and the filtrate is adjusted to a pH of about 3.2. Glutamic acid is allowed to crystallize and is separated therefrom. The glutamic acid recovered usually has a purity of about 98% and is satisfactory for the manufacture of monosodium glutamate.

In order to more fully illustrate the nature and character of the invention, with no intention of being limited thereto, the following example is given.

*Example*

Concentrated sulfuric acid was added to concentrated Steffen's filtrate, having a specific gravity of between about 1.2 and about 1.4, in sufficient amount to obtain a pH of between about 2.5 and about 2.7, and the resulting solution was allowed to stand for several hours. Inorganic sulfate salts were then filtered from the mixture. The recovery of dry, crude potassium sulfate was about 164 grams per kilogram of concentrated Steffen's filtrate used. Concentrated sulfuric acid was added to the filtrate in the amount of about 330 grams per kilogram of concentrated Steffen's filtrate, and the resulting mixture was refluxed for between about six and about seven hours. The resulting hydrolysate was cooled, diluted with about an equal volume of water, and treated with a sufficient amount of milk of lime to obtain a pH of about 5.5. About 330 grams of calcium hydroxide were required per kilogram of concentrated Steffen's filtrate. The resulting slurry was filtered to remove the sulfate-humin cake, and the filtrate was concentrated in vacuo to about 1.5 times the weight of the starting concentrated Steffen's filtrate. The pH of the concentrate was adjusted to about 3.0 with concentrated sulfuric acid, and the resulting mixture was stirred for about 30 minutes at about 60° C. Calcium sulfate was filtered from the hot solution. The filtrate was then concentrated in vacuo to about 0.7 times the weight of the starting concentrated Steffen's filtrate, and glutamic acid was allowed to crystallize therefrom. The crystalline glutamic acid was separated by filtration or by centrifuging.

The crystalline crude glutamic acid, which was recovered in yields of 80% to 85% of the total glutamic acid present, was purified by adding about 2.5 times (or slightly less) its weight of water, and adjusting the pH of the resulting solution with concentrated sulfuric acid to about 0.7. Decolorizing carbon was added to the solution, and the decolorized solution was filtered. The filtrate was adjusted to a pH of about 3.2 with aqueous ammonia, and the glutamic acid was allowed to crystallize and was separated therefrom. The glutamic acid which was recovered had a purity of about 98%.

Having thus fully described and illustrated the character of the invention, what is desired to be secured and claimed by Letters Patent is:

1. The process which comprises treating concentrated Steffen's filtrate with sulfuric acid under substantially non-hydrolyzing conditions in sufficient amount to obtain a pH of between about 2.0 and about 2.9, separating solid material therefrom, hydrolyzing the solution from which solid material has been separated with sulfuric acid, treating the resulting hydrolysate with sufficient amount of agent selected from the group consisting of alkaline earth metal oxides, hydroxides, and carbonates to obtain a pH of between about 5.0 and about 7.0, separating solid material therefrom, concentrating the resulting solution, adding to the concentrated solution acidic material selected from the group consisting of acids and acid anhydrides whose salts with alkaline earth metals are substantially water insoluble in sufficient amount to obtain a pH of between about 2.5 and about 3.5, separating solid material from the adjusted mixture, crystallizing glutamic acid from the resulting mixture, and separating glutamic acid from the hydrolysate end liquid which is abnormally low in ash-forming constituents.

2. The process which comprises treating concentrated Steffen's filtrate with concentrated sulfuric acid under substantially non-hydrolyzing conditions in sufficient amount to obtain a pH of between about 2.0 and about 2.9, separating solid material therefrom, hydrolyzing the resulting solution with concentrated sulfuric acid, treating the hydrolysate with a sufficient amount of agent selected from the group consisting of alkaline earth metal oxides, hydroxides, and carbonates to obtain a pH of between about 5.0 and about 7.0, separating solid material therefrom, concentrating the solution from which solid material has been separated to a specific gravity of between about 1.10 and about 1.40, adding to the concentrated solution acidic material selected from the group consisting of acids and acid anhydrides whose salts with alkaline earth metals are substantially water insoluble in sufficient amount to obtain a pH of between about 2.5 and about 3.5, separating solid material from the adjusted mixture, crystallizing glutamic acid from the resulting solution, and separating the same therefrom.

3. The process which comprises treating concentrated Steffen's filtrate with sulfuric acid under substantially non-hydrolyzing conditions in sufficient amount to obtain a pH of between about 2.0 and about 2.9, separating solid material therefrom, hydrolyzing the resulting solution with sulfuric acid, treating the hydrolysate with calcium hydroxide in sufficient amount to obtain a pH of between about 5.0 and about 7.0, separating solid material therefrom, concentrating the resulting solution, adding sulfuric acid to the concentrated mixture in sufficient amount to obtain a pH of between about 2.5 and about 3.5, separating solid material from the adjusted mixture, crystallizing glutamic acid from the resulting solution, and separating the same from the end liquor which is abnormally low in ash-forming constituents.

4. The process which comprises treating concentrated Steffen's filtrate with sulfuric acid under substantially non-hydrolyzing conditions in sufficient amount to obtain a pH of between about 2.0 and about 2.9, separating solid material therefrom, hydrolyzing the resulting solution with sulfuric acid, treating the hydrolysate with sufficient amount of agent selected from the group consisting of alkaline earth metal oxides, hydroxides, and carbonates to obtain a pH of between about 5.0 and about 7.0, separating solid material therefrom, concentrating the solution from which the solid material has been separated, adding to the concentrated solution acidic material selected from the group consisting of acids and acid anhydrides whose salts with alkaline earth metals are substantially water insoluble in sufficient amount to obtain a pH of between about 2.5 and about 3.5, separating solids from the adjusted mixture, crystallizing glutamic acid from the resulting solution, separating glutamic acid from the end liquor which is abnormally low in ash-forming constituents, suspending the glutamic acid crystals in water, adjusting the pH of the glutamic acid solution to about 0.7, adding decolorizing carbon to the adjusted solution, separating carbon from the resulting decolorized solution, adjusting the pH of the resulting solution to about 3.2, and recovering crystalline glutamic acid therefrom.

References Cited in the file of this patent

UNITED STATES PATENTS

| Number | Name | Date |
| --- | --- | --- |
| 1,721,820 | Ikeda | July 23, 1929 |
| 1,928,840 | Masuda | Oct. 3, 1933 |
| 2,487,785 | Blish | Nov. 15, 1949 |
| 2,487,807 | Hoglan | Nov. 15, 1949 |
| 2,519,573 | Hoglan | Aug. 22, 1950 |
| 2,525,902 | Hoglan et al. | Oct. 17, 1950 |